(12) United States Patent
Waterman (10) Patent No.: US 8,430,441 B2
(45) Date of Patent: Apr. 30, 2013

(54) TRUCK BED LINER

(76) Inventor: Bruce Waterman, Cape May, NJ (US)

( * ) Notice: Subject to any disclaimer, the term of this patent is extended or adjusted under 35 U.S.C. 154(b) by 276 days.

(21) Appl. No.: 12/888,339

(22) Filed: Sep. 22, 2010

(65) Prior Publication Data
US 2012/0068493 A1 Mar. 22, 2012

(51) Int. Cl.
*B60R 13/01* (2006.01)
(52) U.S. Cl.
USPC ............ 296/39.1; 296/136.01; 296/39.2; 296/183.1; 296/50
(58) Field of Classification Search ............. 296/39.2, 296/41, 136.01, 39.1
See application file for complete search history.

(56) References Cited

U.S. PATENT DOCUMENTS

| | | | |
|---|---|---|---|
| 4,047,749 A | 9/1977 | Lambitz | |
| 4,363,617 A * | 12/1982 | Hirsekorn | 425/388 |
| 4,629,390 A | 12/1986 | Burke | |
| 4,763,945 A * | 8/1988 | Murray | 296/57.1 |
| 4,986,590 A | 1/1991 | Patti | |
| 5,000,503 A * | 3/1991 | Bernatek | 296/39.2 |
| D323,639 S * | 2/1992 | Creamer | D12/401 |
| 5,584,524 A | 12/1996 | Vogel | |
| D381,940 S * | 8/1997 | Burton | D12/96 |
| 5,806,909 A * | 9/1998 | Wise | 296/39.1 |
| 5,810,415 A | 9/1998 | Vogel | |
| 6,007,127 A | 12/1999 | Garofalo | |
| 6,042,169 A * | 3/2000 | Emery | 296/39.1 |
| 6,131,983 A | 10/2000 | Jackson | |
| D433,661 S * | 11/2000 | Hanson | D12/401 |
| 6,575,518 B1 * | 6/2003 | Henning | 296/98 |
| D483,314 S * | 12/2003 | Graves | D12/221 |
| 6,692,054 B2 | 2/2004 | Vitoorapakorn | |
| 6,729,671 B2 | 5/2004 | Keles | |
| 7,264,273 B2 * | 9/2007 | Ryan et al. | 280/759 |
| 7,320,572 B2 | 1/2008 | Smith | |
| 7,513,726 B1 * | 4/2009 | Comiskey, Jr. | 410/32 |
| 8,061,761 B1 * | 11/2011 | Sierra | 296/136.01 |
| 2009/0033121 A1 * | 2/2009 | McGorman | 296/39.1 |

OTHER PUBLICATIONS http://www.uniprodusa.com/BedBags.htm (submitted via EFS).

* cited by examiner

*Primary Examiner* — Glenn Dayoan
*Assistant Examiner* — Pinel Romain
(74) *Attorney, Agent, or Firm* — Michael R. Kahn (57) ABSTRACT

Embodiments of the present invention provide a removable bed liner. In one embodiment, the bed liner is comprised of a flexible material, such as polyethylene, nylon, or canvas. These embodiments may be used as a supplement to a rigid bed liner. Side curtains prevent loose material from spilling over the edge of the truck tailgate.

8 Claims, 9 Drawing Sheets

FIG. 7

TRUCK BED LINER

FIELD OF THE INVENTION

The present invention relates generally to truck bed liners, and more particularly, to a truck bed liner comprised of a flexible material.

BACKGROUND

Pick-up trucks are employed for light hauling of various construction materials such as sand, dirt, gravel, mulch, and other "loose fill" materials. This granular material has a tendency to become lodged in the gap or track between the end of the truck bed and tailgate, and, unless this track is kept clean, the normal operation of the tailgate will be hampered resulting in permanent damage to the tailgate and its associated hinge. Therefore, it is desirable to have an improved bed liner for use with loose fill materials.

SUMMARY

Embodiments of the present invention provide a removable bed liner. In one embodiment, the bed liner is comprised of a flexible material, such as polyethylene, nylon, or canvas. These embodiments may be used as a supplement to a rigid bed liner. While rigid bed liners serve to protect the metal of the truck bed, cleaning of such liners after hauling loose fill material can be time consuming. Embodiments of the present invention simplify the cleanup of the truck bed after unloading such cargo. Embodiments of the present invention prevent loose fill, mulch, or construction debris from getting caught in the grooves of a rigid bed liner, basically eliminating the need to sweep out the truck.

DETAILED DESCRIPTION

Figure 1A:
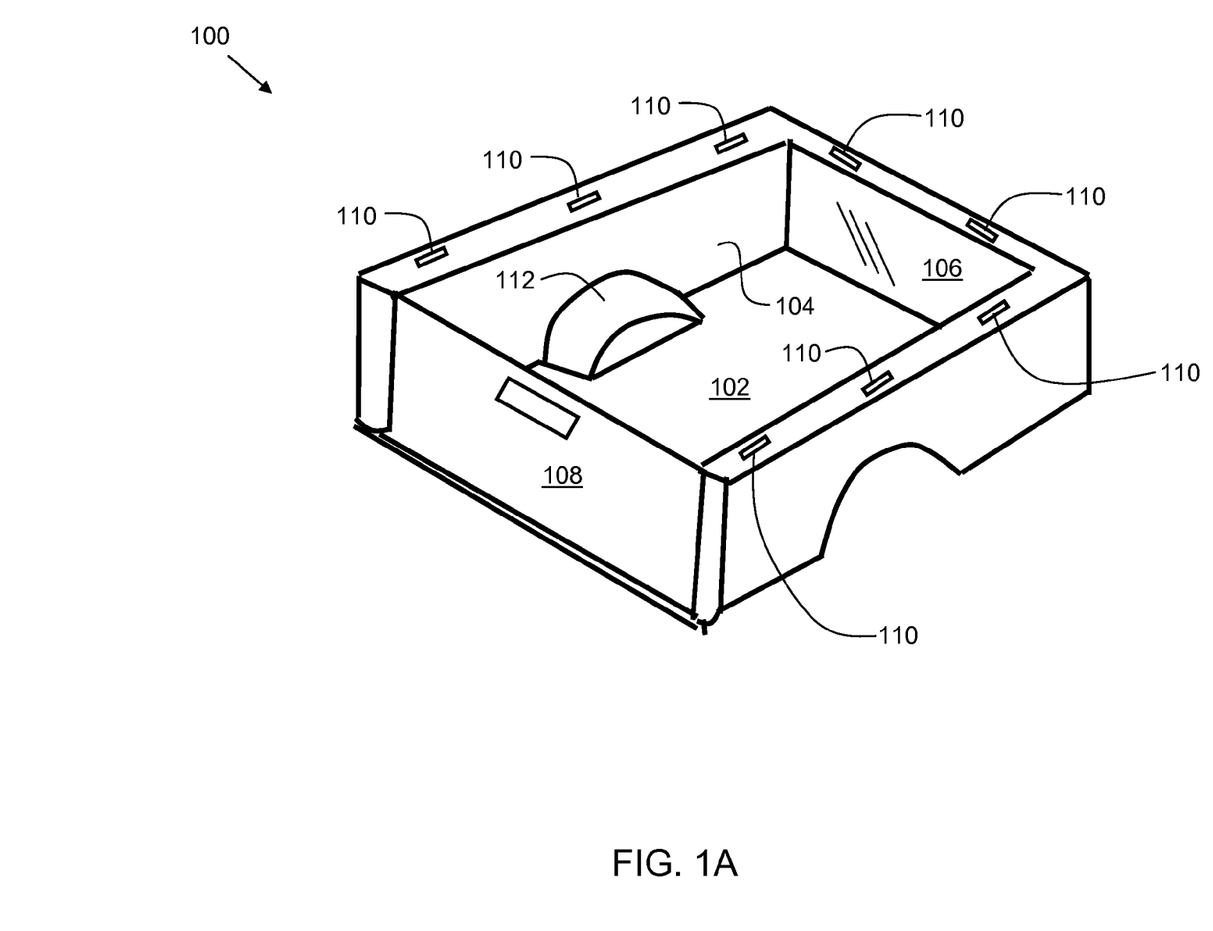
FIG. 1A shows a truck bed with the tailgate in the closed position.
Figure 1B:
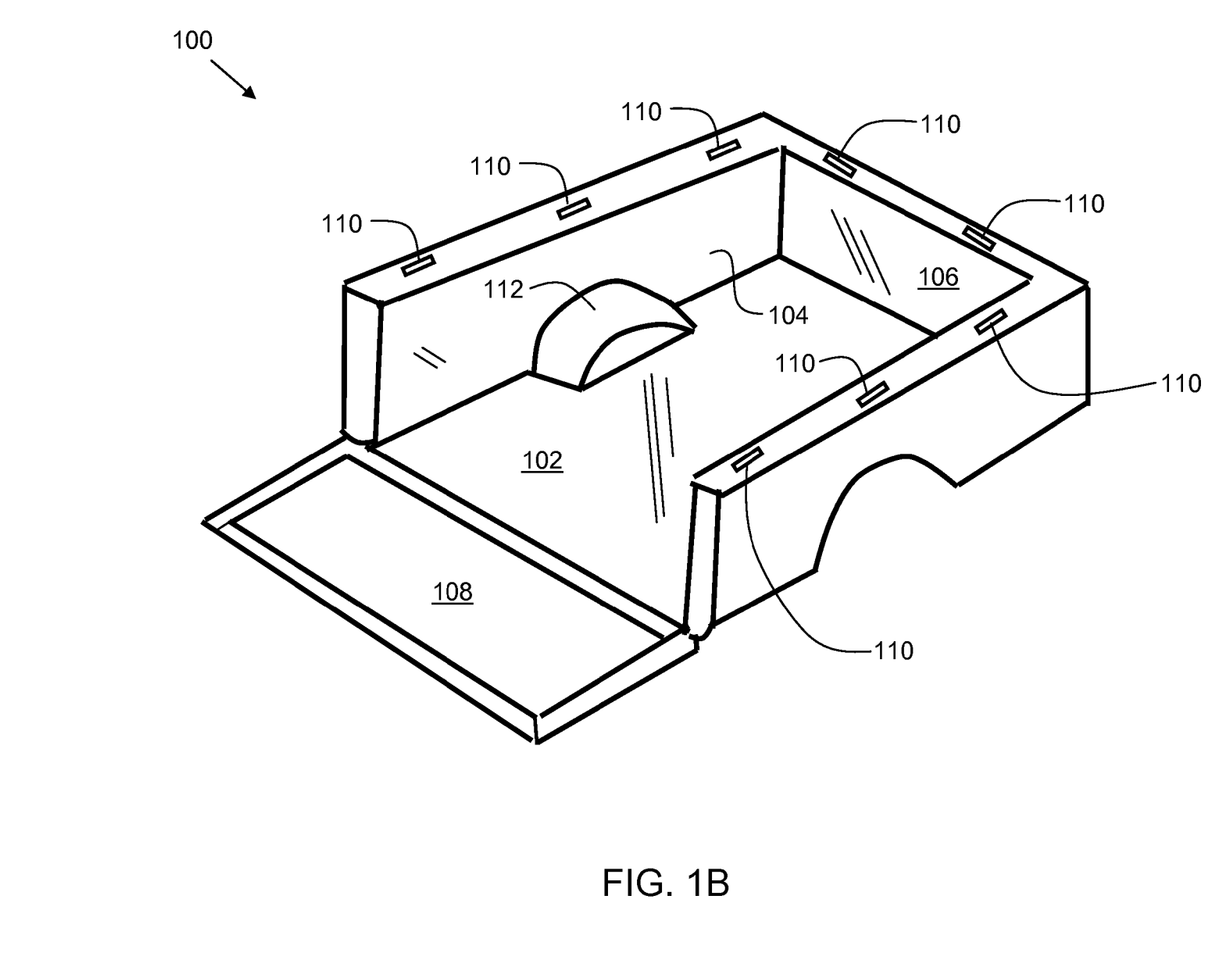
FIG. 1B shows a truck bed with the tailgate in the open position.

FIG. 1A shows a truck bed 100 with the tailgate 108 in the closed position. Truck bed 100 also comprises floor 102, front panel 106, and two side panels 104 (only one side panel visible in this view). Depending on the truck model, a wheel well 112 may protrude from floor 102 for each rear wheel. Some trucks have so-called "step-side" truck beds, which have side panels inside the wheel wells, and hence do not have wheel wells 112 within the bed. For one embodiment of the present invention, a plurality of fasteners 110 is placed around the perimeter of the truck bed, except for on the tailgate 108. In one embodiment, fasteners 110 comprise a component of a hook-and-loop fastening system (e.g. such as the hook part of the hook-and-loop fastener). The fasteners 110 may be fastened to the truck bed via an adhesive. In another embodiment, snaps are used as fasteners 110. FIG. 1B shows truck bed 100 with the tailgate 108 in the open position, as commonly used during loading and unloading.

Figure 2:
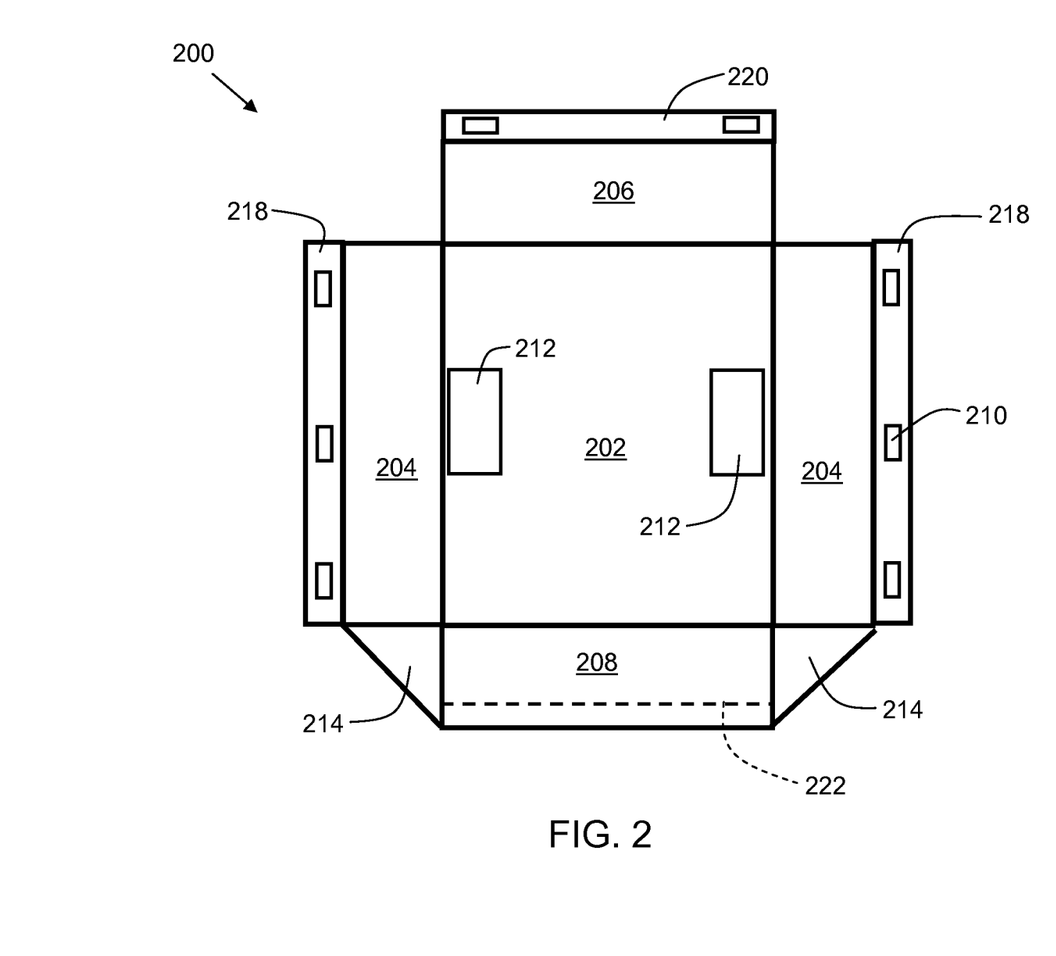
FIG. 2 shows a bed liner in accordance with an embodiment of the present invention.

FIG. 2 shows a truck bed liner 200 in accordance with an embodiment of the present invention. Truck bed liner 200 comprises floor panel 202, two side panels 204, front panel 206, and tailgate panel 208. Adjacent to each side panel 204 is a fastener panel 218 that comprises a plurality of fasteners 210. Note that for the purpose of clarity in the drawings, not all fasteners are indicated with a reference number. Depending on the model of truck, floor panel 202 may also comprise wheel well pockets 212 to accommodate the wheel wells of a truck. Adjacent to front panel 206 is fastener panel 220 which also has a plurality of fasteners 210. In one embodiment, the fasteners 210 are the counterpart to the fasteners 110 shown in FIGS. 1A and 1B. For example, in the case where fasteners 110 comprise hook fasteners, then fasteners 210 comprise loop fasteners, as to allow securing of the truck bed liner 200 to the bed of a truck.

Attached to tailgate panel 208 at each side is a curtain 214. Each curtain 214 is also attached to a side panel 204. Pocket 222 hooks over the tailgate so that it extends the liner 200 when the tailgate is opened.

Figure 3:
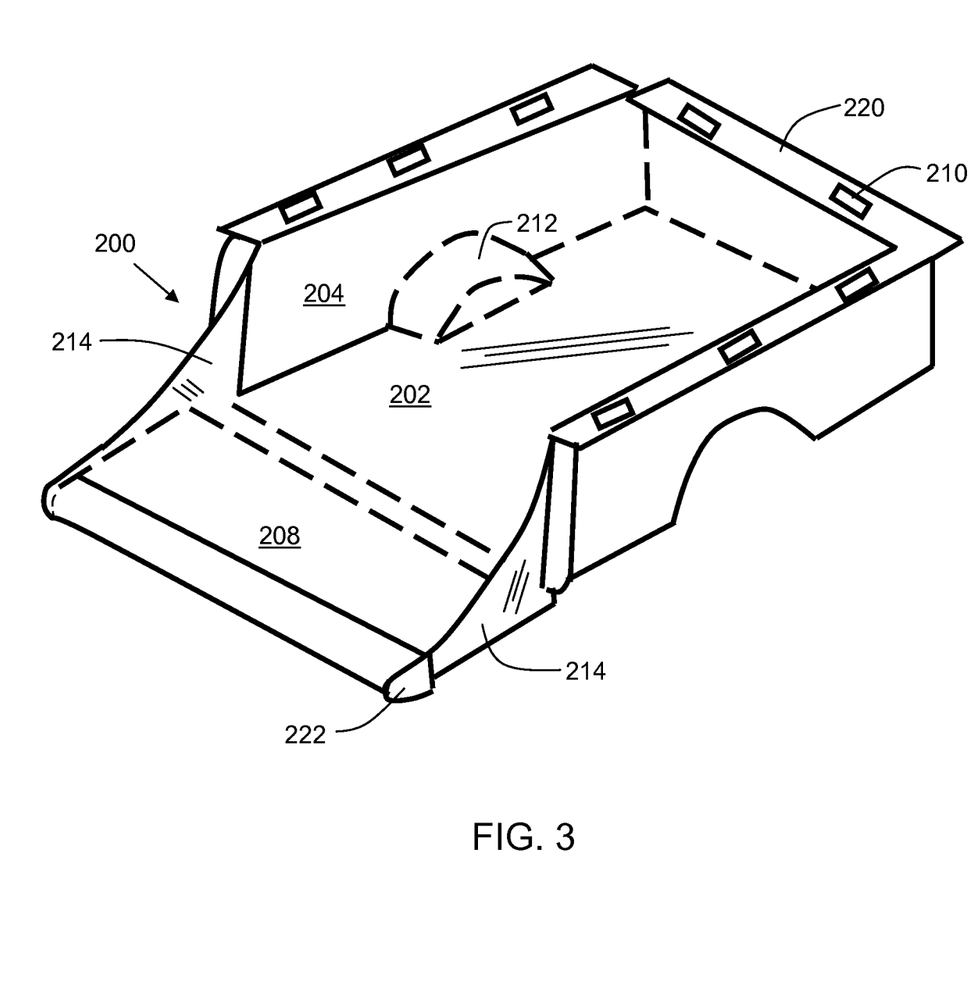
FIG. 3 shows an embodiment of the present invention as installed on a truck bed with the tailgate in the open position.

FIG. 3 shows bed liner 200 as installed on a truck bed with the tailgate in the open position. As can be seen in this view, the curtains 214 serve to contain debris and prevent it from spilling over the sides of the tailgate. The fasteners 210 are located on bed liner 200 as to correspond to the position of fasteners 110 located on the bed, thus serving to fasten the liner to the bed. When loaded (e.g. with gravel), the weight of the cargo also helps to keep the liner in place during transport. When the cargo is mostly removed, some remnants remain on the liner 200. At that time, the liner 200 is then removed from the bed, and can then be washed with a hose. Once dry, the liner can then be folded and stowed in the truck for future use. The fasteners 210 may be of the hook-and-loop variety, to facilitate quick fastening and unfastening. Other fastener types may be used (e.g. snaps, zippers, and the like) without departing from the scope and purpose of the present invention.

Figure 4:
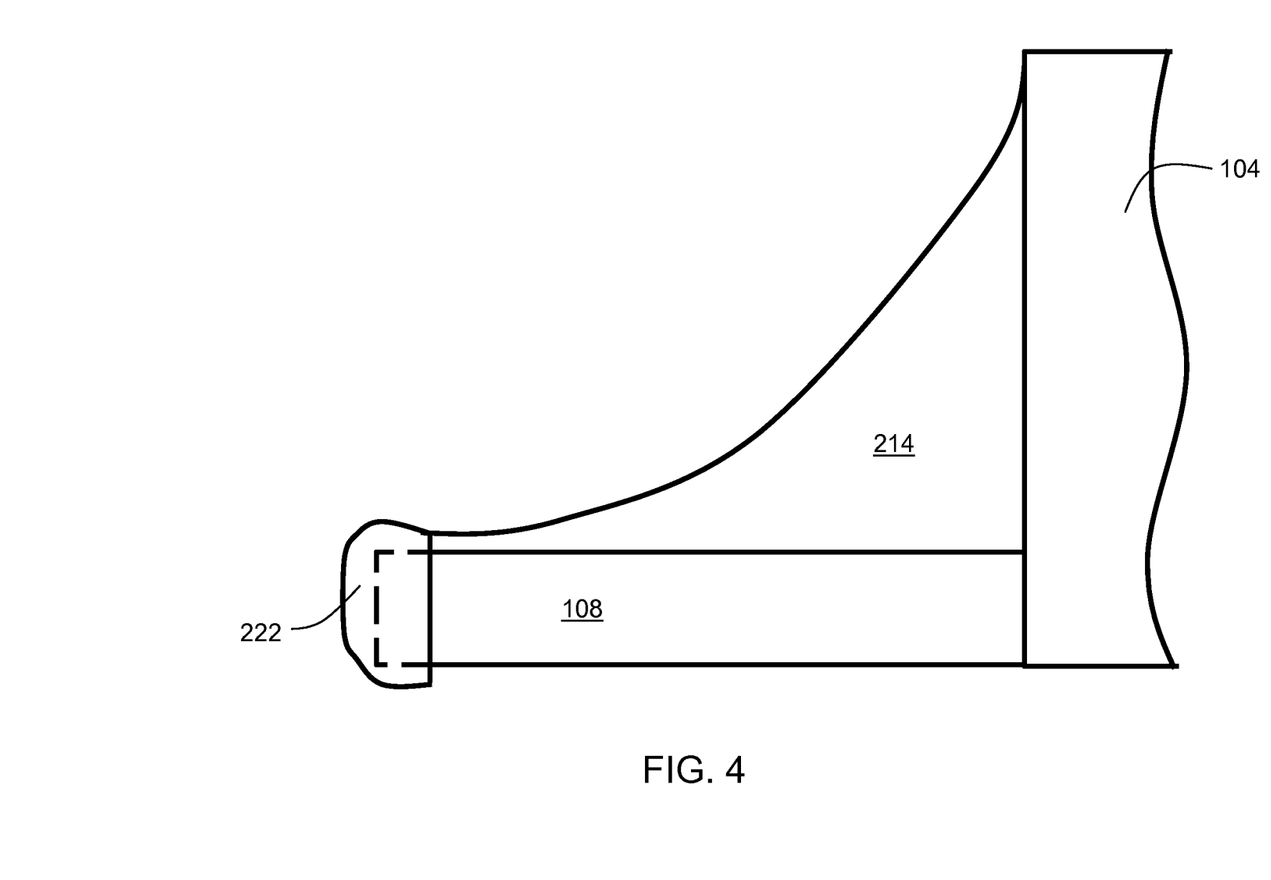
FIG. 4 shows details of a tailgate pocket.

FIG. 4 shows details of the tailgate pocket 222. Pocket 222 fits over the end of tailgate 108, which is shown in the opened position. Curtain 214 is flexible, such that when the tailgate 108 is in the open position, it extends from the side panel 104 of the truck bed to the tailgate 108, and serves to prevent debris from spilling over the side of the tailgate.

Figure 4A:
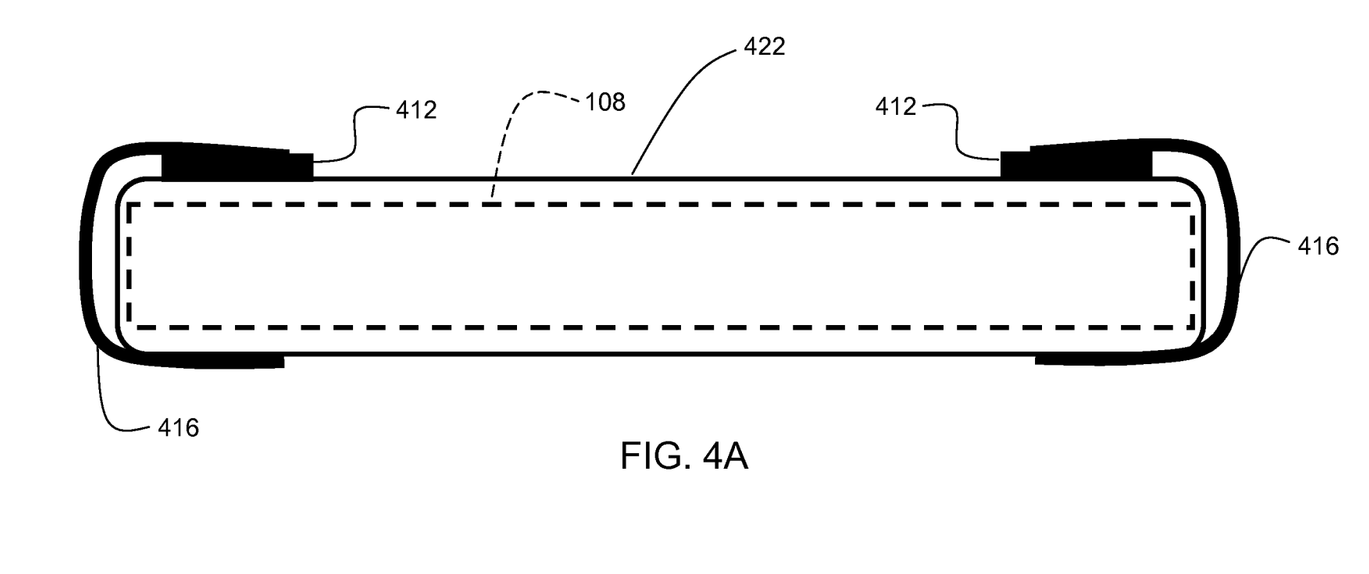
FIG. 4A shows details of an alternative embodiment of a tailgate pocket.

FIG. 4A shows details of an alternative embodiment of a tailgate pocket 422. This view is a rear-facing view of a tailgate pocket 422, which is surrounding an open tailgate 108. Fasteners 412 are affixed to tailgate pocket 422 at each end. Pocket straps 416 are affixed to each end of the tailgate pocket 422 as well. Each pocket strap 416 can be fastened to its corresponding fastener 416 as shown in FIG. 4A, helping ensure that the tailgate pocket 422 stays on the tailgate 108 during transport.

Figure 5:
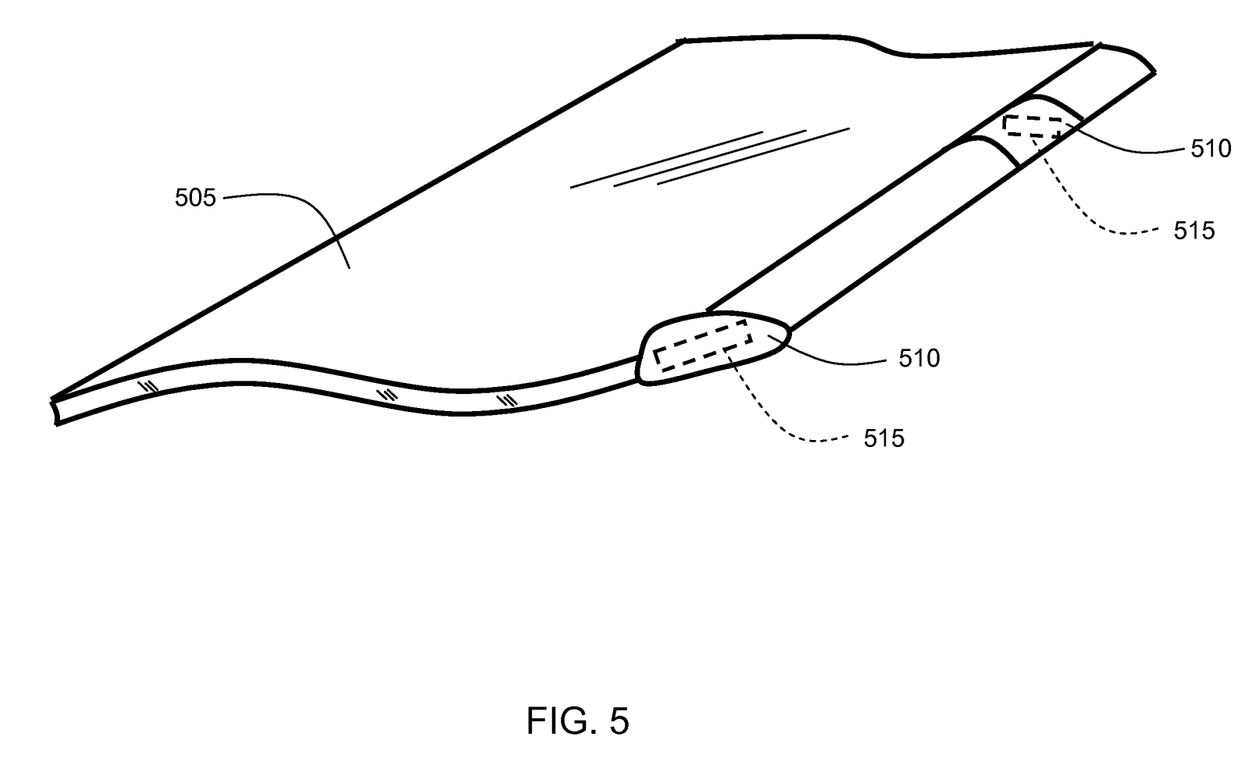
FIG. 5 shows details of an alternate embodiment of the present invention.

FIG. 5 shows details of an alternate embodiment of the present invention. A portion of bed liner 505 is shown. In this embodiment, a sealed pocket 510 is formed at various locations along the edges of the bed liner. Contained within each sealed pocket 510 is a strong magnet 515. These magnets adhere to the metal truck bed to fasten the bed liner to the truck bed. The magnets do not make direct contact with the bed, as they are contained within the sealed pocket, which reduces the risk of scratching the paint of the truck bed. With this embodiment, it is not necessary to apply any complementary fasteners to the truck bed itself (such as fastener 110 of FIG. 1A). This embodiment makes use of the metal truck bed and the magnets 515 to secure the bed liner to the truck bed.

The bed liner is comprised of a flexible material, such as polyethylene, nylon, or canvas. In one embodiment, the bed liner material is polyethylene and further comprises a UV (ultraviolet) resistant treatment, which serves to protect the polyethylene from exposure to sunlight. In one embodiment, the polyethylene bed liner material has a denier weight ranging from about 900 denier to about 1400 denier.

Figure 6:
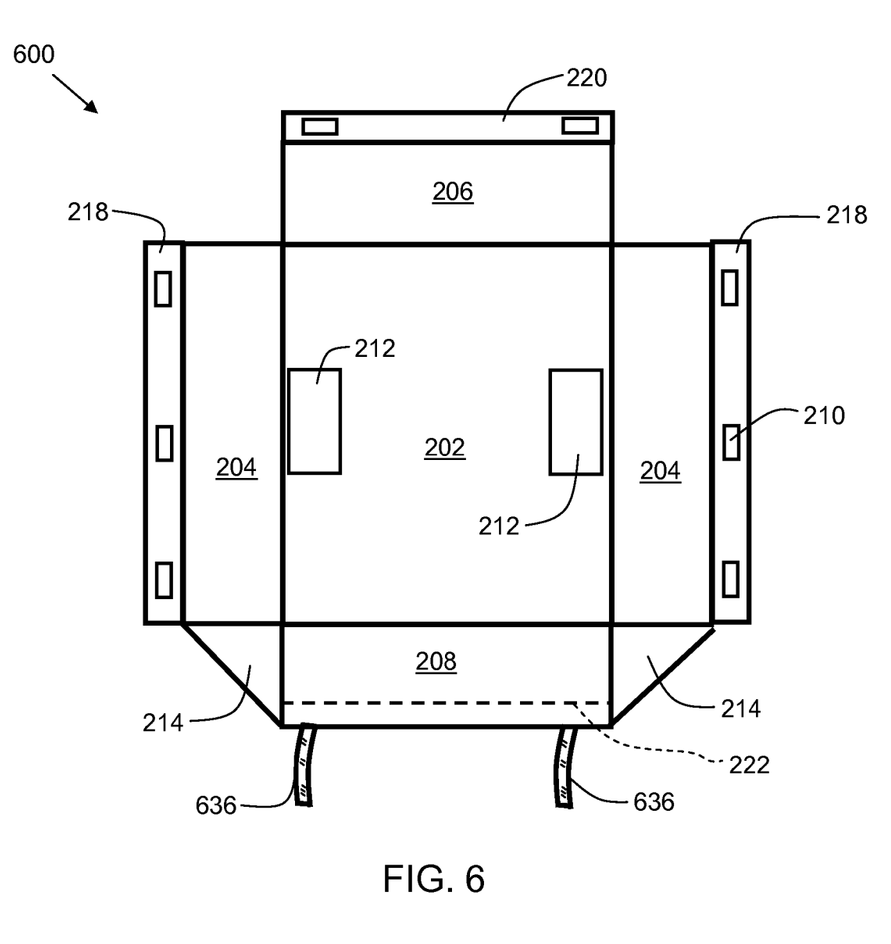
FIG. 6 shows a bed liner in accordance with an additional embodiment of the present invention.

FIG. 6 shows a bed liner 600 in accordance with an additional embodiment of the present invention. Bed liner 600 is similar to bed liner 200, with the addition of a plurality of securing straps 636 disposed at the top end of tailgate panel 208. The securing straps 636 facilitate use with a truck that uses a mesh tailgate that is sometimes used in place of a conventional, hinged metal tailgate. During use, the securing straps 636 are tied to the mesh tailgate to secure it to the mesh tailgate.

Figure 7:
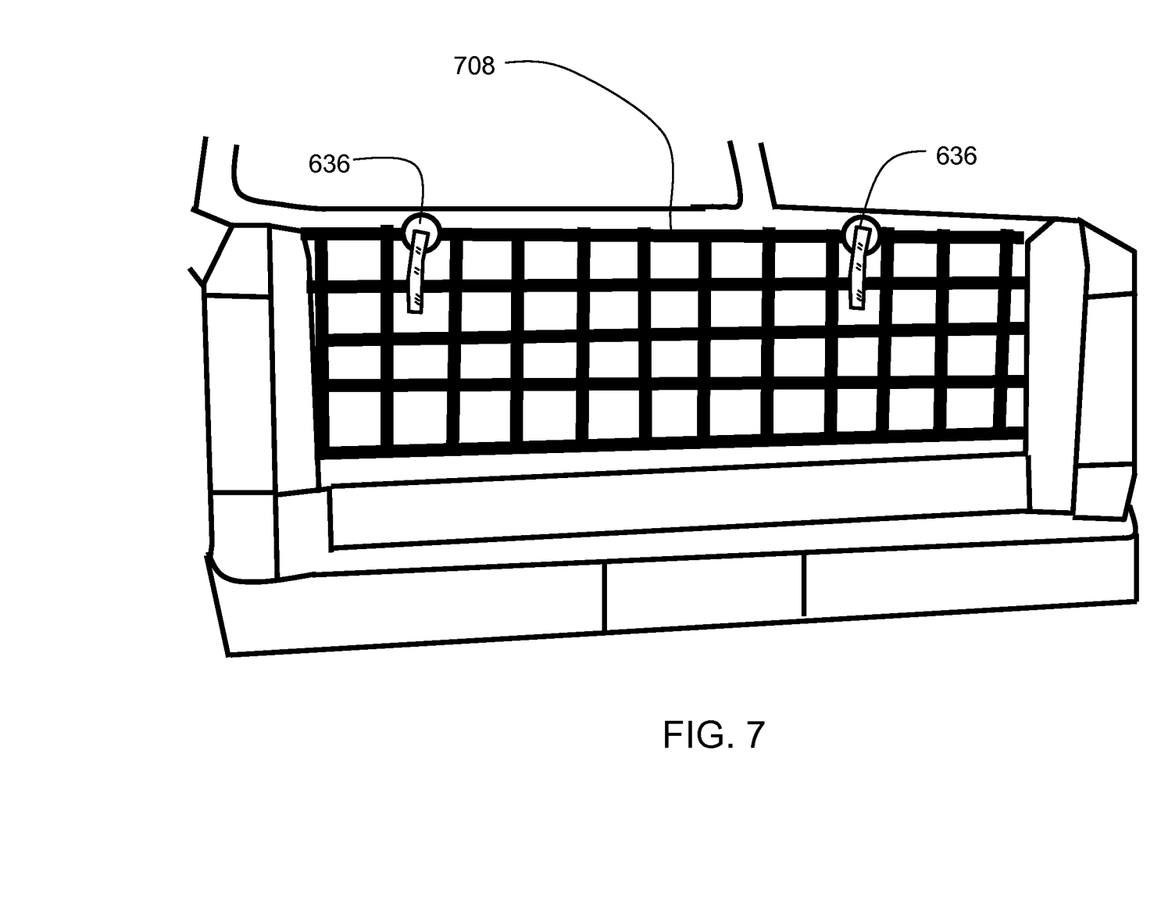
FIG. 7 shows the embodiment of FIG. 6 as mounted on a truck bed with a mesh tailgate.

FIG. 7 shows the embodiment of FIG. 6 as installed on a truck bed with mesh tailgate 708. Securing straps 636 are tied around mesh tailgate 708 near the top of the mesh tailgate 708 which serves to secure the bed liner to the mesh tailgate 708.

Although the description above contains many specific details, these should not be construed as limiting the scope of the invention, but merely as providing illustrations of some of the presently preferred embodiments of the present invention. The present invention may have various other embodiments. Furthermore, while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A truck bed liner, comprising:
a floor panel, two side panels, the two side panels disposed adjacent to the floor panel; a front panel, the front panel disposed adjacent to the floor panel; a tailgate panel, the tailgate panel disposed adjacent to the floor panel;
a plurality of fastener panels, wherein each side panel and the front panel comprises a fastener panel attached thereto;
a plurality of fasteners disposed on the plurality of fastener panels
the truck bed liner further comprising a tailgate pocket at the top end of the tailgate panel, the tailgate pocket configured and disposed to fit over a tailgate of a truck; and wherein the tailgate pocket further comprises a plurality of pocket straps affixed to the tailgate pocket, and a plurality of fasteners, the fasteners configured and dispose to receive a pocket strap, thereby securing the tailgate pocket.

2. The truck bed liner of claim 1, wherein the plurality of fasteners comprise hook-and-loop fasteners.

3. The truck bed liner of claim 1, further comprising a plurality of wheel well pockets disposed in the floor panel.

4. The truck bed liner of claim 1, wherein each panel and curtain is comprised of polyethylene material.

5. The truck bed liner of claim 1, wherein each panel and curtain is comprised of nylon.

6. The truck bed liner of claim 1, further comprising two curtains, each curtain disposed adjacent to the tailgate panel.

7. The truck bed liner of claim 1, further comprising a plurality of securing straps at the top end of the tailgate panel.

8. A truck bed liner, comprising:
a floor panel, and two side panels, the two side panels disposed adjacent to the floor panel;
a front panel, the front panel disposed adjacent to the floor panel;
a tailgate panel, the tailgate panel disposed adjacent to the floor panel;
a tailgate pocket at the top end of the tailgate panel, the tailgate pocket configured and disposed to fit over a tailgate of a truck;
wherein the tailgate pocket further comprises a plurality of pocket straps affixed to the tailgate pocket, and a plurality of fasteners, the fasteners configured and dispose to receive a pocket strap, thereby securing the tailgate pocket; two curtains, each curtain disposed adjacent to the tailgate panel; a plurality of hook-and-loop fasteners disposed on truck bed liner; a tailgate pocket formed at the top end of the tailgate panel, the tailgate pocket configured and disposed to fit over a tailgate of a truck; and two wheel well pockets formed in the floor panel, disposed to conform to wheel wells of a truck.

\* \* \* \* \*